United States Patent
Kojima (10) Patent No.: US 9,871,468 B2
(45) Date of Patent: Jan. 16, 2018

(54) VIBRATION-TYPE DRIVING DEVICE

(71) Applicant: CANON KABUSHIKI KAISHA, Tokyo (JP)

(72) Inventor: Nobuyuki Kojima, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 330 days.

(21) Appl. No.: 14/174,758

(22) Filed: Feb. 6, 2014

(65) Prior Publication Data

US 2014/0152149 A1 Jun. 5, 2014

Related U.S. Application Data

(62) Division of application No. 13/158,255, filed on Jun. 10, 2011, now Pat. No. 8,704,426.

(30) Foreign Application Priority Data

Jun. 14, 2010 (JP) ................. 2010-135500

(51) Int. Cl.
*H02N 2/02* (2006.01)
*H02N 2/00* (2006.01)
*H02N 2/10* (2006.01)

(52) U.S. Cl.
CPC ............. *H02N 2/001* (2013.01); *H02N 2/004* (2013.01); *H02N 2/026* (2013.01); *H02N 2/103* (2013.01)

(58) Field of Classification Search
CPC .......... H02N 2/001; H02N 2/004; H02N 2/02; H02N 2/10; H02N 2/103

USPC ................ 310/323.01–323.21, 328
See application file for complete search history.

(56) References Cited

U.S. PATENT DOCUMENTS 5,982,075 A * 11/1999 Hayasaka .............. H02N 2/004
                                                          310/12.01
2010/0176690 A1 * 7/2010 Adachi ............... H01L 41/0913
                                                          310/330

FOREIGN PATENT DOCUMENTS

| JP | H02-146971 A | 6/1990 |
| JP | 2000-060164 A | 2/2000 |
| JP | 2001-086777 A | 3/2001 |
| JP | 2003-339176 A | 11/2003 |
| JP | 2006-158054 A | 6/2006 |
| JP | 2007-074829 A | 3/2007 |
| JP | 2009-165221 A | 7/2009 |

* cited by examiner

*Primary Examiner* — Derek Rosenau
(74) *Attorney, Agent, or Firm* — Canon U.S.A., Inc. IP Division (57) ABSTRACT

A vibration-type driving device according to the present invention includes a plurality of vibrators in which contact portions perform an elliptical motion using a combination of vibrations in different vibration modes; and a driven object having contact regions that come into contact with the contact portions and move relative to the plurality of vibrators, wherein the contact regions for the individual vibrators differ in position so as not to overlap.

18 Claims, 9 Drawing Sheets

MODE-A

MODE-B

VIBRATION-TYPE DRIVING DEVICE

CROSS REFERENCE TO RELATED APPLICATIONS

The present application is a divisional of U.S. patent application Ser. No. 13/158,255, filed on Jun. 10, 2011, the content of which is expressly incorporated by reference herein in its entirety. This application also claims the benefit of Japanese Patent Application No. 2010-135500 filed on Jun. 14, 2010, which is hereby incorporated by reference herein in its enitirety.

BACKGROUND OF THE INVENTION

Field of the Invention

The present invention relates to vibration-type driving devices. Specifically, it relates to a vibration-type driving device that moves a vibrator and a driven object relative to each other using a combination of vibrations in different vibration modes.

Description of the Related Art

For a vibration-type driving device using a vibrator of the type in which vibrations in different vibration modes (shapes) are combined, a configuration in which a plurality of vibrators are provided to ensure the output has been proposed. U.S. Pat. No. 7,466,062 discloses a configuration in which a plurality of vibrators that generate a combination of vibrations in a longitudinal vibration mode in the longitudinal direction of the vibrator and an out-of-plane bending vibration mode are disposed on concentric circles and in which a driven object that is to come into pressure contact with the plurality of vibrators is rotated relative to the plurality of vibrators.

One problem with the vibration-type driving device using a vibrator of the type in which vibrations in different vibration modes are combined has a plurality of vibrators to ensure the output is a decrease in operating life. The operating life of the vibration-type driving device sometimes depends on the wear of contact regions (sliding regions) of the driven object with which contact portions of the vibrators are to come into contact.

In the vibration-type driving device disclosed in U.S. Pat. No. 7,466,062, the rotation angle of the driven object is not particularly limited, and the driven object rotates at a desired rotation angle. Furthermore, in the case of the foregoing vibration-type driving device, the contact regions of the driven object are the same for the plurality of vibrators. Therefore, the amount of wear at the contact regions of the driven object increases substantially in proportion to an increase in the number of vibrators, as compared with a case in which one vibrator is used. This may promote the decrease of the life of the vibration-type driving device. Furthermore, for the case where only the amount of wear of a portion of the contact regions is larger than that at the other portions, the life may expire because the amount of wear of the portion reaches the limit even if the other portions maintain the performance.

Figure 14A:
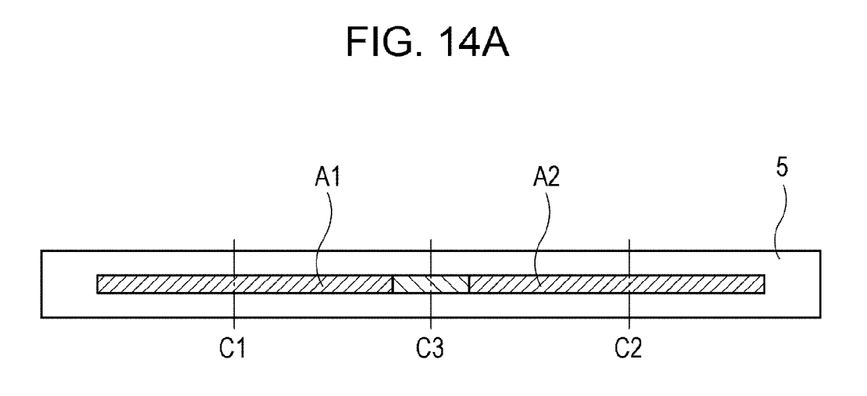
FIGS. 14A and 14B are schematic diagrams showing a problem to be solved by the present invention.
Figure 14B:
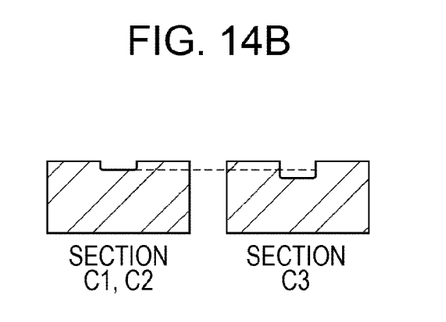

FIGS. 14A and 14B schematically show the state of local wear described above. This will be described using an example in which contact portions of two vibrators (not shown) are in pressure contact with one surface of a driven object 5. FIG. 14A shows contact regions A1 and A2 of the driven object 5 relative to two vibrators in a hatch pattern. The contact regions A1 and A2 overlap substantially in the center of the driven object 5. FIG. 14B shows the schematic cross-sectional view of the wear of the driven object 5 caused by the operation of the vibration-type driving device. A cross section only at the contact region A1 is denoted by C1, a cross section only at the contact region A2 is denoted by C2, and a cross section at which the contact regions A1 and A2 overlap is denoted by C3. Sections C1 and C2 individually come into friction contact with one vibrator, while section C3 comes into friction contact with two vibrators. Therefore, section C3 is worn substantially twice as much as sections C1 and C2. When section C3 is worn to the limit, the life of the vibration-type driving device expires.

SUMMARY OF THE INVENTION

The present invention prevents an increase in the amount of wear of the contact region of a driven object to prevent a decrease in the operating life of a vibration-type driving device that uses a plurality of vibrators.

The present invention provides a vibration-type driving device including a plurality of vibrators in which contact portions perform an elliptical motion using a combination of vibrations in different vibration modes; and a driven object having contact regions that come into contact with the contact portions and move relative to the plurality of vibrators, wherein the contact regions for the individual vibrators differ in position so as not to overlap.

The present invention can prevent the wear of the contact region of a driven object from being worsened to prevent a decrease in the operating life of a vibration-type driving device that uses a plurality of vibrators.

Further features of the present invention will become apparent from the following description of exemplary embodiments with reference to the attached drawings.

DESCRIPTION OF THE EMBODIMENTS

Embodiments of the present invention will be described hereinbelow in detail with reference to the drawings.
First Embodiment In this embodiment, a vibration-type driving device applied to a device that requires not a continuous rotation driving operation but a reciprocating operation at a desired rotation angle will be described. For example, it is used in a lens linear motion mechanism using the rotary motion of a cylindrical rotary cam or in aperture driving using a rotary motion in a lens drive mechanism.

Figure 1:
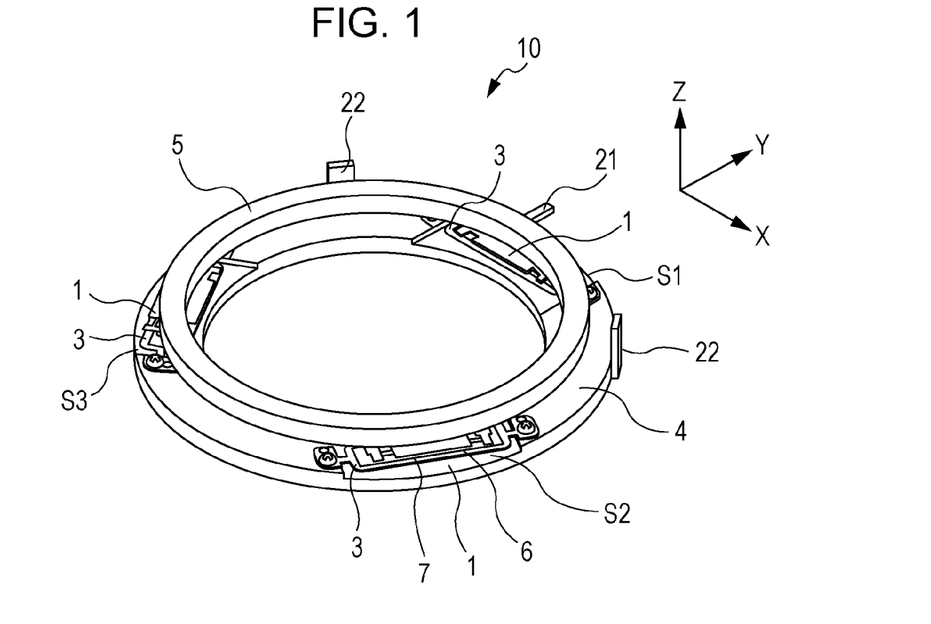
FIG. 1 is a perspective view of a vibration-type driving device according to a first embodiment of the present invention.

FIG. 1 is a perspective view showing the configuration of the principal part of a vibration-type driving device 10 according to a first embodiment of the present invention. The vibration-type driving device 10 in FIG. 1 includes three vibrator units S1, S2, and S3, a holding member 4 that holds the vibrator units S1, S2, and S3, and the driven object 5 held in pressure contact with the vibrator units S1, S2, and S3. The vibrator units S1, S2, and S3 have the same shape, each of which is composed of a vibrator 1 and a joint member 3 that joins the vibrator 1 to the holding member 4. The vibrator 1 includes a vibration plate 6 that is formed of a plate-like elastic body having two protrusions as contact portions with the driven object 5 and a substantially rectangular electro-mechanical energy conversion element 7 joined to the vibration plate 6. The vibrator 1 is also provided with a flexible printed board (not shown) that electrically connects the electro-mechanical energy conversion element 7 and the outside together. Examples of the electro-mechanical energy conversion element include elements such as a piezoelectric element and an electrostriction element.

Figure 3:
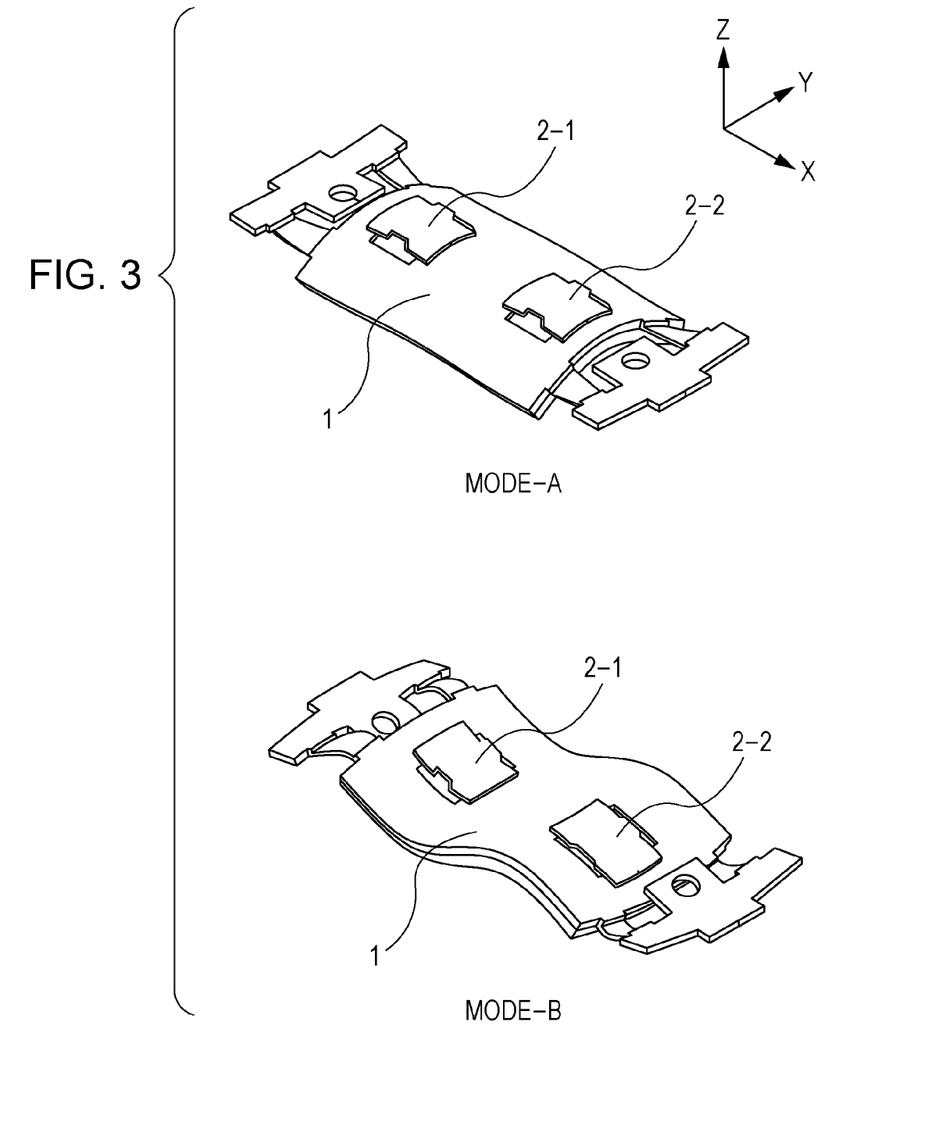
FIG. 3 is a perspective view showing the vibration modes of a vibrator to which the first embodiment of the present invention is applicable.

Here, vibrations in two vibration modes (shape) excited by the vibrator 1 of this embodiment will be described using FIG. 3. In this embodiment, AC voltage is applied to the electro-mechanical energy conversion element 7 of the vibrator 1 to excite two out-of-plane bending vibration modes (MODE-A and MODE-B) in the vibrator 1. MODE-A is a primary out-of-plane bending vibration mode in which two nodes appear parallel to the X-axis direction in the drawing, that is, the longitudinal direction of the vibrator 1. The vibration in MODE-A excites an amplitude displaced in a direction perpendicular to the surface that is to come into contact with the driven object 5 (Z-axis direction) in protrusions 2-1 and 2-2. MODE-B is a secondary out-of-plane bending vibration mode in which three nodes appear substantially parallel to the Y-axis in the drawing of the vibrator 1. The vibration in MODE-B excites an amplitude displaced in a direction parallel to the surface that is to come into contact with the driven object 5 (X-axis direction) in the protrusions 2-1 and 2-2.

Figure 15A:
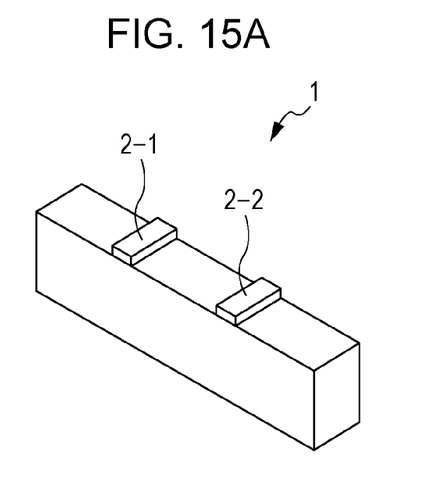
FIG. 15A is a schematic diagram showing the form of a vibrator to which the present invention is applicable.
Figure 15B:
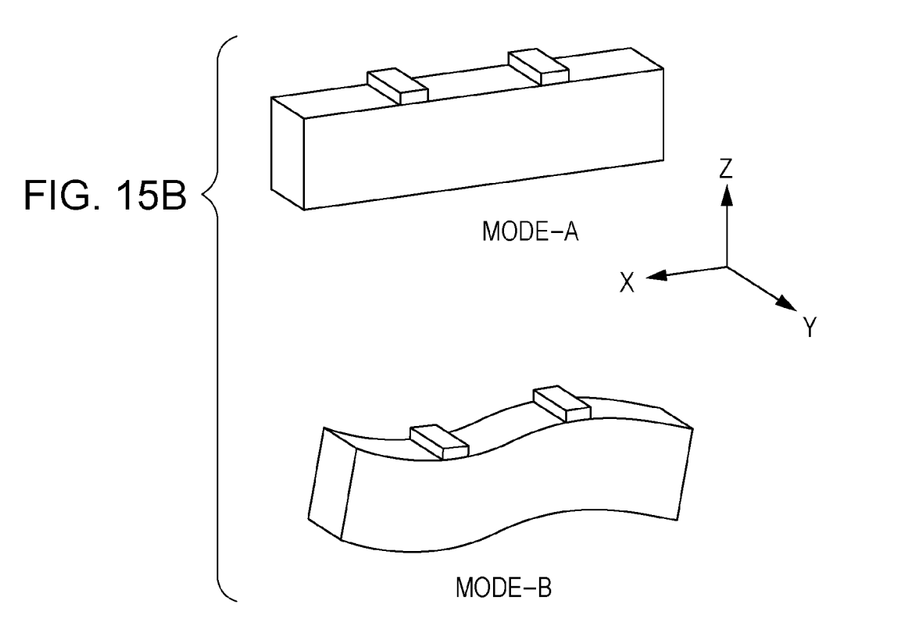
FIG. 15B is a schematic diagram showing the form and vibration modes of the vibrator to which the present invention is applicable.

By combining the two vibration modes, an elliptical motion substantially in an X-Z plane is generated on the upper surfaces of the protrusions 2-1 and 2-2, that is, contact portions, to cause a force that relatively moves the driven object 5 in a direction that substantially coincides with the X-axis direction. However, the present invention is not limited to the configuration of the vibrator 1 described above; it may be a vibrator that excites a vibration in another out-of-plane bending vibration mode, or alternatively, a vibrator with a configuration in which another vibration mode, as shown in FIGS. 15A and 15B, may be used. The vibrator 1 shown in FIG. 15A is a substantially rectangular parallelepiped, in which the primary longitudinal vibration mode (MODE-A) stretching in the X-axis direction, as shown in FIG. 15B, and the secondary out-of-plane bending vibration mode (MODE-B) in which three nodes appear substantially parallel to the Y-axis direction are excited. By combining the two different vibration modes, an elliptical vibration in substantially an X-Z plane is generated on the upper surfaces of the protrusions 2-1 and 2-2. By operating the vibrator 1 in FIGS. 15A and 15B in this way, the vibrator 1 can be applied to the present invention, like the vibrator 1 shown in FIG. 3.

Referring back to FIG. 1, the configuration of the vibration-type driving device 10 of this embodiment will be described. The joint member 3 is used to fix the vibrator 1 to a desired position of the holding member 4. The driven object 5 is shaped like a ring, and the bottom at a lower part of the drawing is formed to be flat so as to be parallel to the X-Y plane. This bottom comes into contact with the vibrator 1. The driven object 5 is restricted in another axial movement and linear movement by a guide member (not shown) so as to be rotatable about the central axis of the ring (hereinafter referred to as central axis).

Figure 2:
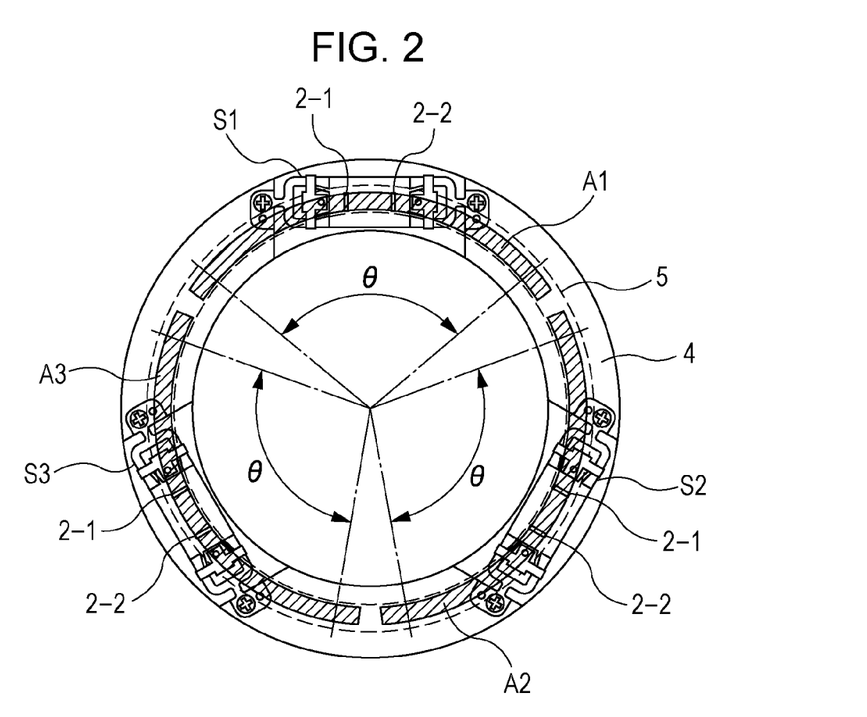
FIG. 2 is a plan view of the vibration-type driving device according to the first embodiment of the present invention.

As shown in FIG. 2, the three vibrator units S1, S2, and S3 are disposed at positions on substantially concentric circles with respect to the central axis, at which the circumference is divided into substantially three equal parts. The vibrator units S1, S2, and S3 are fixed by the holding member 4 in such a manner that the upper surfaces of the protrusions 2-1 and 2-2 having contact surfaces with the driven object 5 are parallel to the X-Y plane.

This embodiment is provided with limiting members that mechanically limit the operating range to define the relative movement distance between the vibrator units S1, S2, and S3 and the driven object 5. Specifically, two detents 22 are formed around the outer periphery of the holding member 4, and a projection 21 is formed on the driven object 5. The projection 21 is movable in the range between the detents 22. That is, the detents 22 and the projection 21 function as limiting members that mechanically limit the relative movement of the driven object 5.

In FIG. 2, the driven object 5 is shown, only in outline, by a chain line so that the positions and shapes of the vibrator units S1, S2, and S3 can be clearly shown. The contact regions of the driven object 5 that are to come into contact with the individual vibrators are hatched in FIG. 2 as contact regions A1, A2, and A3 in correspondence with the vibrator units S1, S2, and S3, respectively. In this embodiment, the relative movement distance θ (rotation angle) between the vibrator units S1, S2, and S3 and the driven object 5 is defined so that the contact regions A1, A2, and A3 are independent in the circumferential direction (located at different positions in the circumferential direction) without overlapping.

Figure 4:
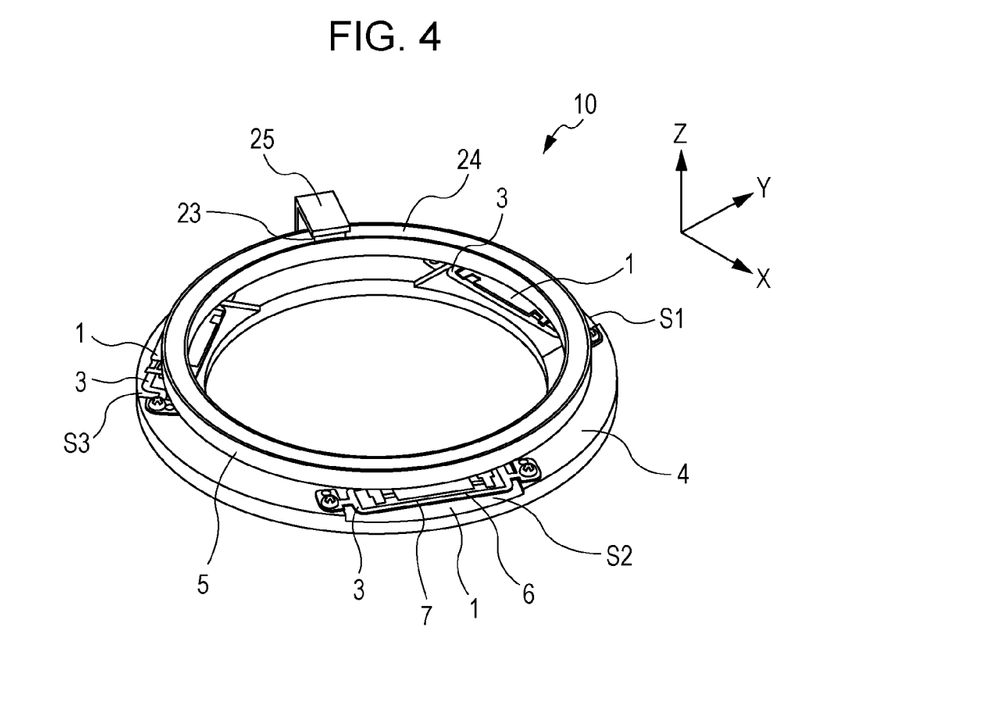
FIG. 4 is a perspective view of a modification of the vibration-type driving device according to the first embodiment of the present invention.

However, the present invention is not limited to the configuration in which the relative movement distance θ is limited with a mechanical structure, such as the limiting members. A conceivable modification of this embodiment is a configuration in which the relative position is defined depending on a detection signal obtained by detecting a rotation amount. FIG. 4 is a schematic diagram showing an example of a vibration-type driving device (a modification of the first embodiment) including a detecting member that electrically detects the relative movement distance θ. In FIG. 4, a detecting head 23 of an optical encoder is disposed nearer to the upper surface of the driven object 5 in spaced-apart relationship from the driven object 5, and a scale 24 of the optical encoder is disposed on the upper surface of the driven object 5 in opposing relationship to the detecting head 23. The detecting head 23 is fixed by an optical-head holder 25 extending from the outer periphery of the holding member 4. In this modification, the relative-position information on the driven object 5 is obtained from the detection signal of the optical encoder serving as the detecting member. The range of the relative movement of the driven object 5 may be defined on the basis of the relative-position information and perform control so that the contact regions A1, A2, and A3 do not overlap. The detecting member for obtaining the relative-position information may be of any other system or configuration, such as a magnetic system.

In this embodiment, as described above, since the range of relative movement is limited so that the contact regions A1, A2, and A3 for the individual vibrators are located at different positions without overlapping, the contact regions A1, A2, and A3 are worn substantially uniformly. This provides substantially twice as long as the operating life of a case where the contact regions A1, A2, and A3 partly overlap. A mechanism using the vibration-type driving device of this embodiment may be designed on the basis of a desired relative movement distance θ so that the contact regions A1, A2, and A3 do not overlap. Although the foregoing vibration-type driving device 10 has three vibrator units, the number is not necessarily limited thereto in the present invention. Any number of vibrator units greater than or equal to two may be used depending on depending on the required torque or the like.

Second Embodiment

Figure 5:
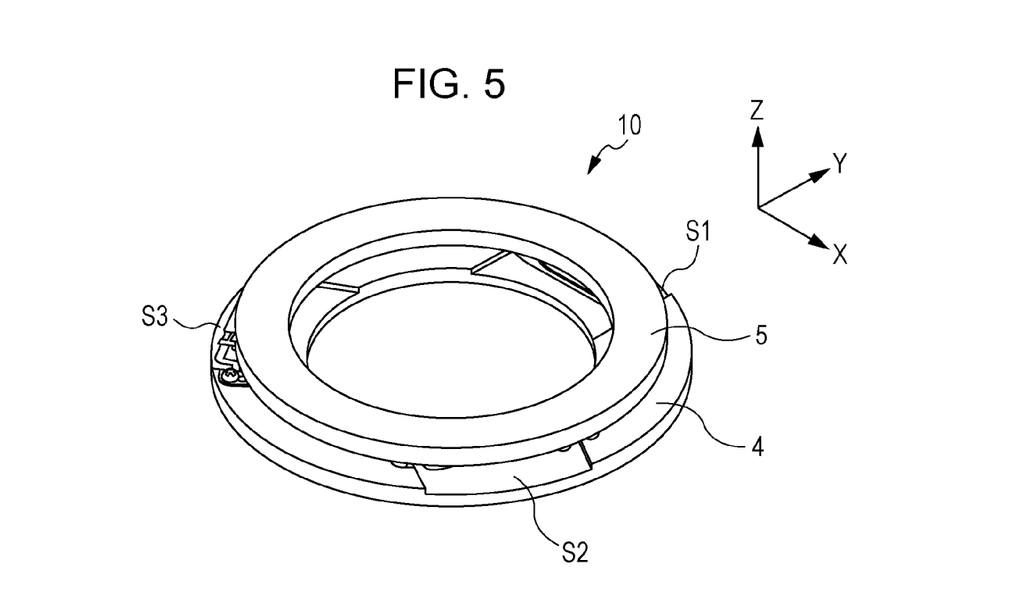
FIG. 5 is a perspective view of a vibration-type driving device according to a second embodiment of the present invention.
Figure 6:
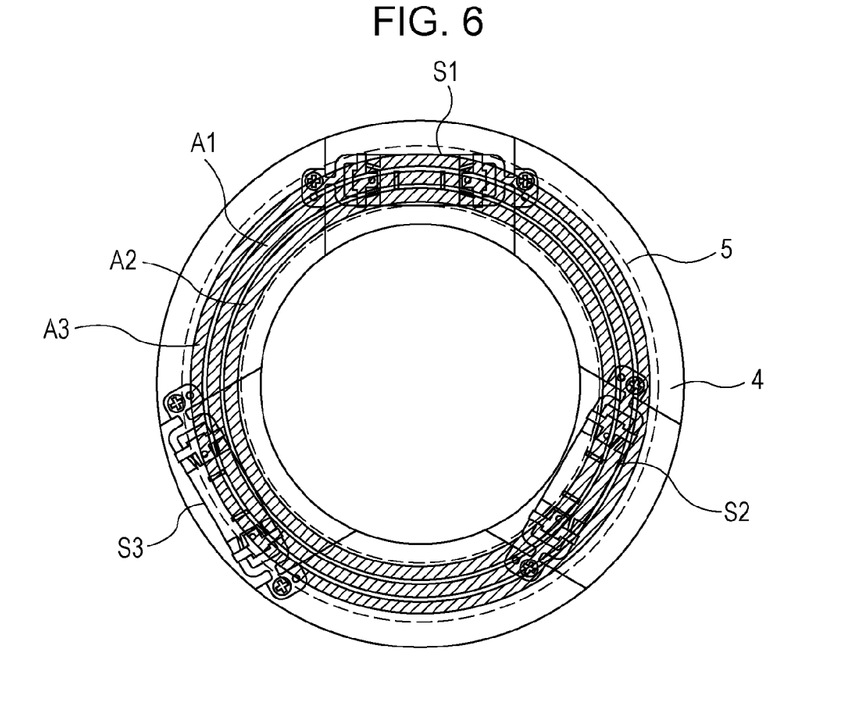
FIG. 6 is a plan view of the vibration-type driving device according to the second embodiment of the present invention.

In this embodiment, a vibration-type driving device applied to continuous rotation driving will be described. FIG. 5 is a perspective view showing the configuration of the principal part of a vibration-type driving device 10 of a second embodiment of the present invention. Descriptions of the same components as those of the vibration-type driving device 10 of the first embodiment shown in FIG. 1 are omitted, and only differences will be described. FIG. 6 is a plan view of the vibration-type driving device 10 shown in FIG. 5, in which the driven object 5 is shown, only in outline, by a chain line so that the positions and shapes of the vibrator units S1, S2, and S3 can be understood. The contact regions of the driven object 5 are denoted by A1, A2, and A3 in correspondence with the vibrator units S1, S2, and S3, respectively. The vibrator units S1, S2, and S3 are located at positions on the holding member 4, at which the circumference is divided into substantially three equal parts, such that the distances from the central axis to the projections of the individual vibrators differ from one another. In other words, the contact regions A1, A2, and A3 for the individual vibrators are located at different positions in the radial direction so as not to overlap, and for the distances from the central axis to the projections of the individual vibrators, different values are selected so that the contact regions A1, A2, and A3 do not overlap with one another.

Accordingly, in this embodiment, since the contact regions A1, A2, and A3 are located at different positions without overlapping, the contact regions A1, A2, and A3 are substantially uniformly worn. The amount of wear of the contact regions A1, A2, and A3 of the driven object 5 are substantially one third of that in the case where the vibrator units S1, S2, and S3 are located so that the three contact regions A1, A2, and A3 overlap, thus increasing the operating life. Furthermore, the number of vibrator units is not necessarily limited to three, as in the first embodiment. Any number of vibrator units greater than or equal to two may be used depending on the required torque or the like. Furthermore, although the vibrator units S1, S2, and S3 in FIG. 6 are located at positions at which the circumference is divided into substantially three equal parts, the positions of the vibrator units S1, S2, and S3 in the circumferential direction are not limited thereto in this embodiment, they may be located at any positions.

Third Embodiment

Figure 7:
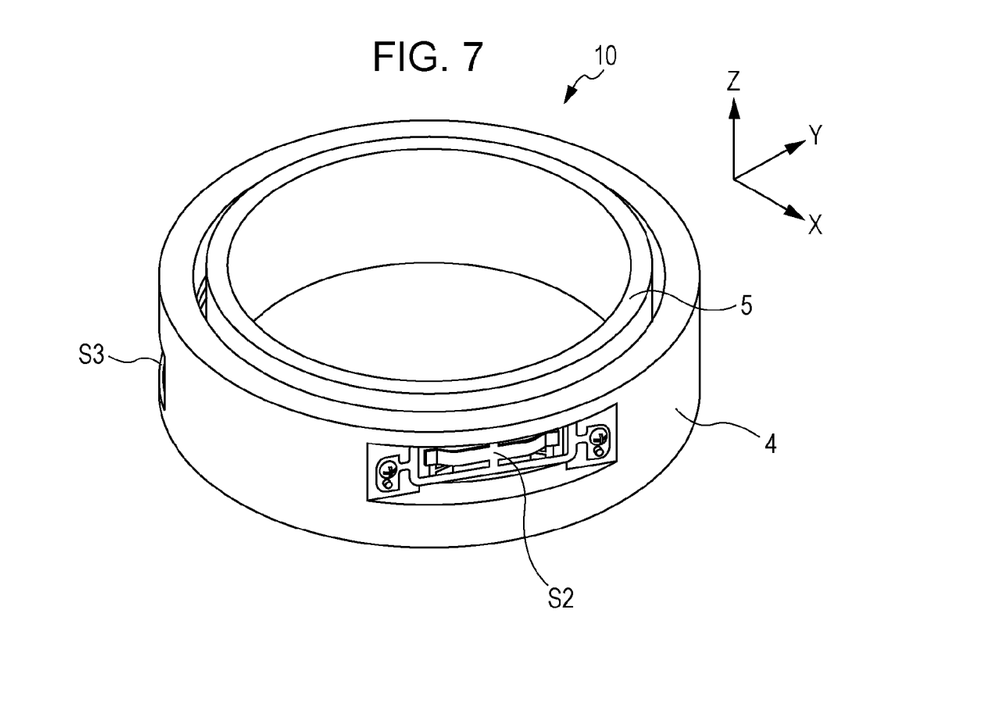
FIG. 7 is a perspective view of a vibration-type driving device according to a third embodiment of the present invention.

In a vibration-type driving device of this embodiment, the vibrators are disposed on the side of the driven object 5, unlike the first and second embodiments. FIG. 7 is a perspective view that schematically shows the configuration of a vibration-type driving device 10 of a third embodiment of the present invention. In this embodiment, the driven object 5 is substantially cylindrical in shape, and the contact regions of the driven object 5 are formed on the outer peripheral side. The driven object 5 is held so as to be rotatable about the central axis of the cylinder relative to the holding member 4, and other axial rotations and translational movement are restricted.

Figure 8:
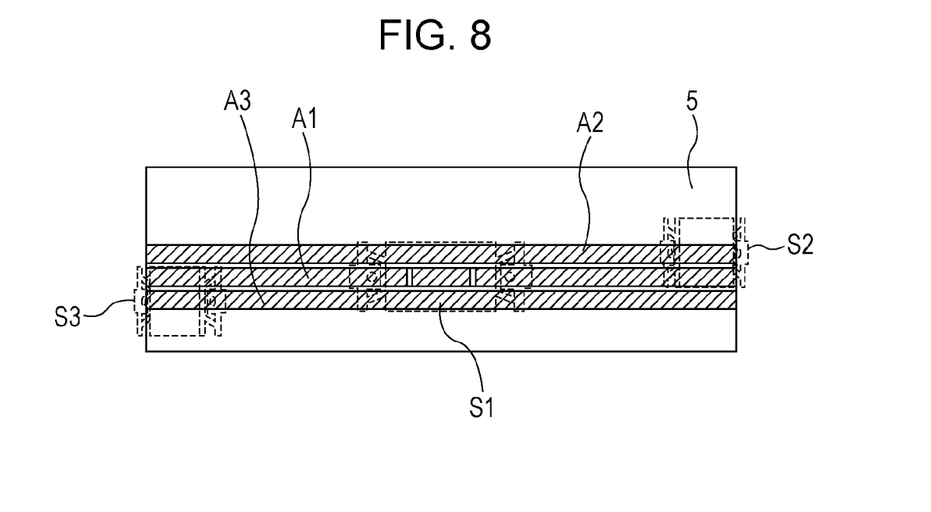
FIG. 8 is a side view of the vibration-type driving device according to the third embodiment of the present invention.

The vibrator units S1, S2, and S3 are fixed by the holding member 4 in such a manner that the upper surfaces of the projections, which are to come into contact with the driven object 5, are in contact with the outer peripheral surface of the driven object 5. The configuration of the vibrators is the same as those of the first and second embodiments. FIG. 8 is a side view of the vibration-type driving device 10 shown in FIG. 7, in which the holding member 4 is removed so that the placement positions of the vibrator units S1, S2, and S3 and the contact regions A1, A2, and A3 of the driven object 5 can be viewed. The contact regions of the driven object 5 are denoted by A1, A2, and A3 in correspondence with the vibrator units S1, S2, and S3, respectively.

The vibrator units S1, S2, and S3 are located at positions at which the circumference is divided into substantially three equal parts, such that they are located at different positions in the central axis direction of the cylindrical shape of the driven object 5 (in the Z-direction in the drawing, synonymous with the rotation axis direction). For the positions in the central axis direction, values at which the contact regions A1, A2, and A3 of the driven object 5 do not overlay with one another are selected, as shown in FIG. 8. In other words, since the contact regions A1, A2, and A3 for the individual vibrators in this embodiment are located at different positions in the rotation axis direction so as not to overlap, the contact regions A1, A2, and A3 are substantially uniformly worn. Furthermore, as in the first and second embodiments, there is no need to limit the number of vibrator units to three. Any number of vibrator units greater than or equal to two may be used depending on the required torque or the like. Furthermore, although the vibrator units S1, S2, and S3 are located at positions at which the circumference is divided into substantially three equal parts, the positions of the vibrator units S1, S2, and S3 in the circumferential direction are not limited thereto in this embodiment, they may be located at any positions.

Fourth Embodiment

Figure 9:
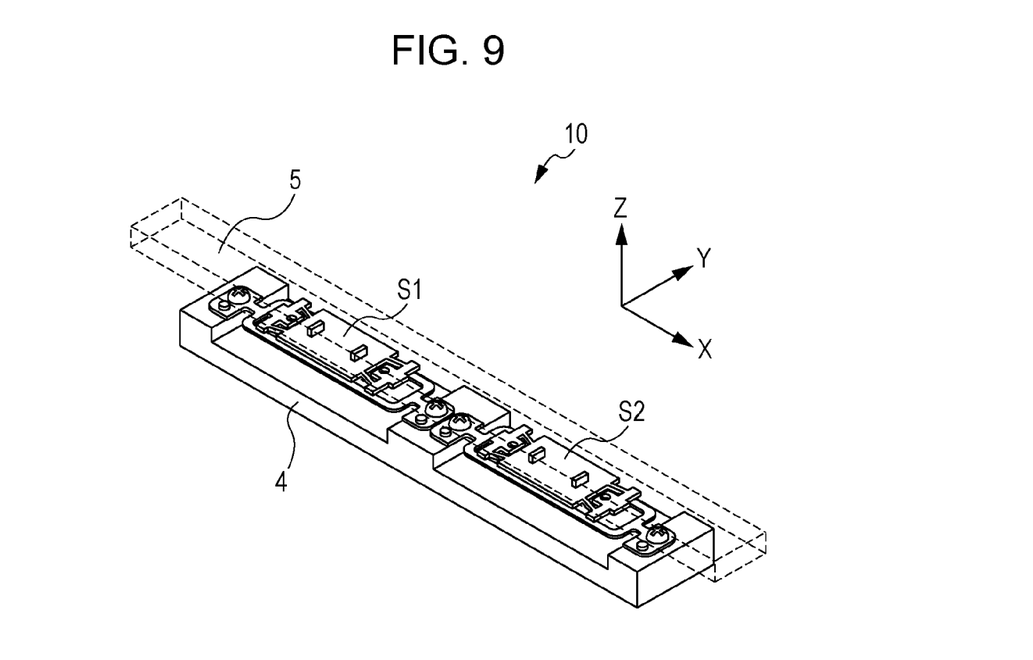
FIG. 9 is a perspective view of a vibration-type driving device according to a fourth embodiment of the present invention.

In this embodiment, a configuration in which the driven object 5 is linearly moved (translated) relative to the plurality of vibrators, unlike the first to third embodiments, will be described. FIG. 9 is a perspective view showing the configuration of the principal part of a vibration-type driving device 10 of a fourth embodiment. Two vibrator units S1 and S2 are disposed substantially in a row in the X-direction (in the direction of linear movement) in the drawing and are fixed by the holding member 4. The configuration of the vibrators is the same as those of the first to third embodiments. In this embodiment, the driven object 5 is a substantially rectangular parallelepiped and extends in the X-direction. The driven object 5 moves in the X-direction relative to the vibrator units S1 and S2. The driven object 5 is held by a guide (not shown) so that only the freedom of translation in the X-direction is provided.

Figure 10:
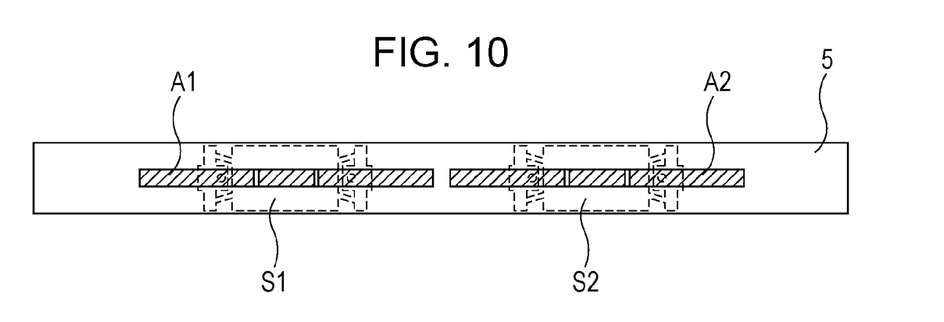
FIG. 10 is a plan view of the vibration-type driving device according to the fourth embodiment of the present invention.

FIG. 10 is a plan view of the vibration-type driving device 10 shown in FIG. 9, in which the positional relationship between the driven object 5 and the vibrator units S1 and S2 is shown. The distance in the X-direction between the two vibrator units S1 and S2 is determined so that the contact regions A1 and A2 do not overlap when the driven object 5 is linearly moved by a necessary stroke. A method for differentiating the positions of the vibrators so that the contact regions A1 and A2 do no overlap may use a limiting member that limits the relative movement distance of the driven object 5, as shown in the first embodiment. Furthermore, the relative position information on the driven object 5 may be obtained by a detecting member to define the range of relative movement.

As described above, in this embodiment, since the positions of the contact regions A1 and A2 differ from one vibrator to another in the direction of the linear movement, and thus, they do not overlap, the contact regions A1 and A2 are substantially uniformly worn. The number of vibrator units is not necessarily limited to two; any number of vibrator units greater than or equal to two may be used depending on the required torque or the like.

Fifth Embodiment

In this embodiment, a configuration in which the driven object 5 is linearly moved relative to the plurality of vibrators, as in the fourth embodiment, will be described. It differs from the fourth embodiment in the placement position of the vibrator unit in the direction perpendicular to linear movement.

Figure 11:
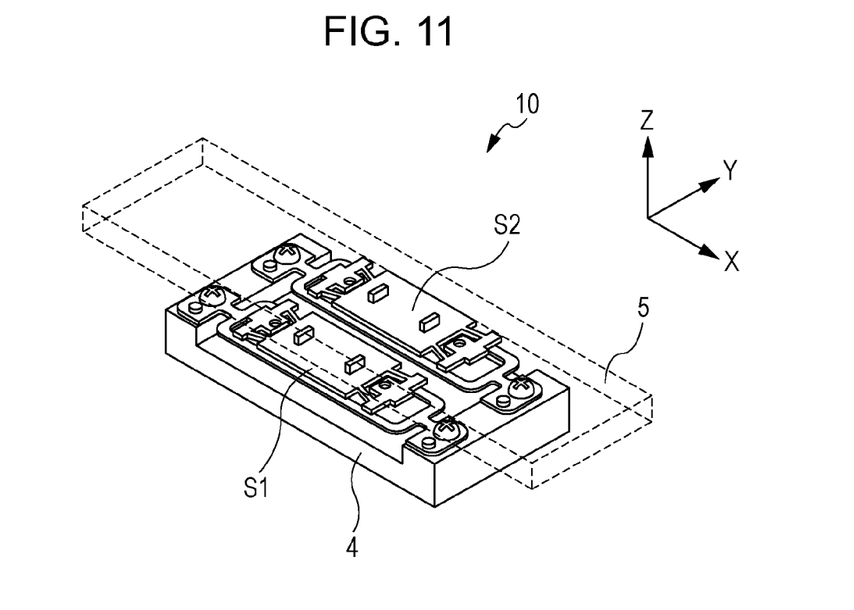
FIG. 11 is a perspective view of a vibration-type driving device according to a fifth embodiment of the present invention.
Figure 12:
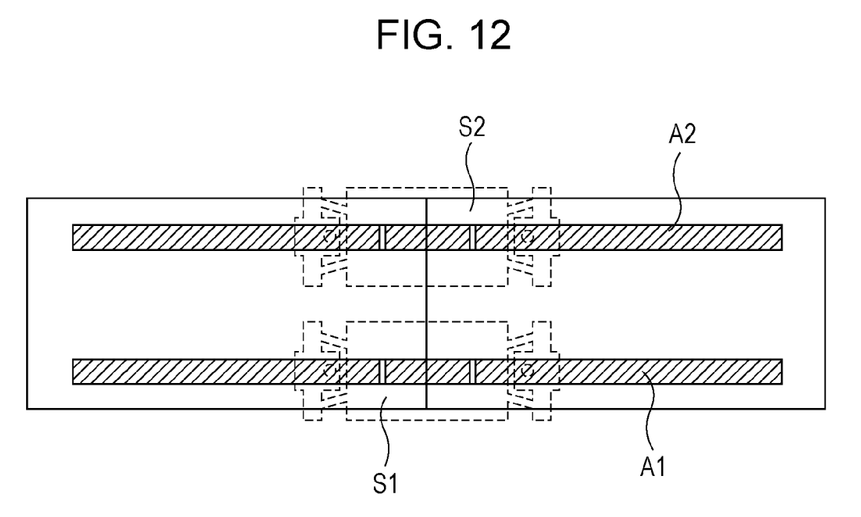
FIG. 12 is a plan view of the vibration-type driving device according to the fifth embodiment of the present invention.

FIG. 11 is a perspective view showing, in outline, the configuration of a vibration-type driving device 10 of a fifth embodiment. FIG. 12 is a plan view of the vibration-type driving device 10 shown in FIG. 11, in which the positional relationship between the driven object 5 and the vibrator units S1 and S2 is shown. In this embodiment, the driven object 5 moves linearly in the X-direction relative to the two vibrator units S1 and S2. The vibrator units S1 and S2 are disposed side by side in the Y-direction (in the direction perpendicular to the linear movement) on the holding member 4. The driven object 5 is shaped in the form of a rectangular parallelepiped having sizes in the X-Y directions so that contact regions to come into contact with the two vibrator units S1 and S2 arranged in the Y-direction can be ensured.

Figure 13:
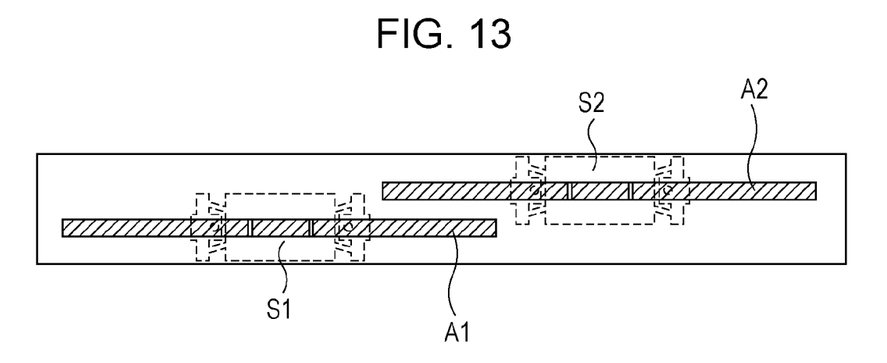
FIG. 13 is a plan view of a modification of the vibration-type driving device according to the fifth embodiment of the present invention.

By disposing the vibrator units S1 and S2 in this way, the two contact regions A1 and A2 of the driven object 5 are located at different positions and do not overlap, so that the contact regions A1 and A2 are substantially uniformly worn. Furthermore, the number of vibrator units is not necessarily limited to two; any number of vibrator units greater than or equal to two may be used depending on the required torque or the like. Furthermore, although the two vibrator units S1 and S2 are disposed side by side in the Y-direction in FIG. 12, the present invention is not limited to the foregoing configuration provided that the contact regions A1 and A2 do no overlap. For example, as shown in FIG. 13, the vibrator units S1 and S2 may be staggered in the direction of the linear movement and in a direction perpendicular to the linear movement. The placement as shown in FIG. 13 can reduce the size of the driven object 5 in the direction perpendicular to the linear movement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-135500 filed on Jun. 14, 2010, which is hereby incorporated by reference herein in its entirety.

What is claimed is:

1. A vibration-type driving device comprising:
   a first vibrator comprising a first vibration plate including a first contact portion and a first electro-mechanical energy conversion element joined to the first vibration plate;
   a second vibrator comprising a second vibration plate including a second contact portion and a second electro-mechanical energy conversion element joined to the second vibration plate; and
   a driven object comprising:
      a first contact region in contact with the first contact portion; and
      a second contact region in contact with the second contact portion,
   wherein the first and second vibrators and the driven object are configured to relatively rotate about a rotation axis,
   wherein a position of the first vibrator differs from a position of the second vibrator in a radial direction and a circumferential direction with respect to the rotation axis, and
   wherein the first contact region and the second contact region do not overlap with each other in the circumferential direction,
   wherein a distance between the first and the second contact regions in the radial direction is less than a sum of a distance between the first contact portion and an edge of the second contact region side of the first vibration plate in the radial direction and a distance between the second contact portion and an edge of the first contact region side of the second vibration plate in the radial direction.

2. The vibration-type driving device according to claim 1, wherein the first contact portion and the second contact portion each perform an elliptical motion.

3. The vibration-type driving device according to claim 1, wherein a combined vibration of vibrations in different vibration modes is excited in each of the first vibrator and the second vibrator.

4. The vibration-type driving device according to claim 1,
   wherein the first vibrator is configured to excite vibration in the first contact portion but not to excite vibration in the second contact portion, and
   wherein the second vibrator is configured to excite vibration in the second contact portion but not to excite vibration in the first contact portion.

5. The vibration-type driving device according to claim 1, wherein the first vibrator and the second vibrator are arranged with a gap therebetween either along a joining plane of the first vibration plate and the first electro-mechanical energy conversion element or along a joining plane of the second vibration plate and the second electro-mechanical energy conversion element.

6. The vibration-type driving device according to claim 1, wherein the first vibrator and the second vibrator are arranged with a gap therebetween along the circumferential direction.

7. The vibration-type driving device according to claim 1, wherein the first vibration plate comprises:
   a first protrusion as the first contact portion; and
   a second protrusion as a third contact portion which comes into contact with a third contact region of the driven member, and
   wherein the second vibration plate comprises:
   a third protrusion as the second contact portion; and
   a fourth protrusion as a fourth contact portion which comes into contact with a fourth contact region of the driven member.

8. The vibration-type driving device according to claim 1, wherein the first and the second contact regions overlap with each other in the radial direction.

9. The vibration-type driving device according to claim 1, wherein a width of the first contact region in the radial direction is less than a width of the first vibration plate in the radial direction,
   wherein a width of the second contact region in the radial direction is less than a width of the second vibration plate in the radial direction,
   wherein the distance between the first and the second contact regions in the radial direction is less than the width of the first vibration plate in the radial direction, and
   wherein the distance between the first and the second contact regions in the radial direction is less than the width of the second vibration plate in the radial direction.

10. A vibration-type driving device comprising:
   a first vibrator comprising a first vibration plate including a first contact portion and a first electro-mechanical energy conversion element being joined to the first vibration plate;
   a second vibrator comprising a second vibration plate including a second contact portion and a second electro-mechanical energy conversion element being joined to the second vibration plate; and
   a driven object comprising:
     a first contact region in contact with the first contact portion; and
     a second contact region in contact with the second contact portion,
   wherein the first and second vibrators and the driven object are configured to relatively move in a first direction of a linear movement,
   wherein a position of the first vibrator differs from a position of the second vibrator in the first direction and a second direction perpendicular to the linear movement direction, and
   wherein the first contact region and the second contact region do not overlap with each other in the first direction,
   wherein a distance between the first and the second contact regions in the second direction is less than a sum of a distacne between the first contact portion and an edge of the second contact region side of the first vibration plate in the second direction and a distance between the second contact portion and an edge of the first contact region side of the second vibration plate in the second direction.

11. The vibration-type driving device according to claim 10, wherein the first vibrator and the second vibrator are arranged with a gap therebetween either along a joining plane of the first vibration plate and the first electro-mechanical energy conversion element or along a joining plane of the second vibration plate and the second electro-mechanical energy conversion element.

12. The vibration-type driving device according to claim 10, wherein the first vibrator and the second vibrator are arranged with a gap therebetween along the linear movement direction.

13. The vibration-type driving device according to claim 10, wherein a combined vibration of vibrations in different vibration modes is excited in each of the first vibrator and the second vibrator.

14. The vibration-type driving device according to claim 10, wherein the first vibration plate comprises:
   a first protrusion as the first contact portion; and
   a second protrusion as a third contact portion which comes into contact with a third contact region of the driven member, and
   wherein the second vibration plate comprises:
   a third protrusion as the second contact portion; and
   a fourth protrusion as a fourth contact portion which comes into contact with a fourth contact region of the driven member.

15. The vibration-type driving device according to claim 10,
   wherein the first vibrator is configured to excite vibration in the first contact portion but not to excite vibration in the second contact portion, and
   wherein the second vibrator is configured to excite vibration in the second contact portion but not to excite vibration in the first contact portion.

16. The vibration-type driving device according to claim 10, wherein the first contact portion and the second contact portion each perform an elliptical motion.

17. The vibration-type driving device according to claim 10, wherein the first and the second contact regions overlap with each other in the second direction.

18. The vibration-type driving device according to claim 10,
   wherein a width of the first contact region in the second direction is less than a width of the first vibration plate in the second direction,
   wherein a width of the second contact region in the second direction is less than a width of the second vibration plate in the second direction,
   wherein the distance between the first and the second contact regions in the second direction is less than the width of the first vibration plate in the second direction, and
   wherein the distance between the first and the second contact regions in the second direction is less than the width of the second vibration plate in the second direction.

* * * * *